Jan. 15, 1924.

N. LEERBERG 1,480,910

MACHINE FOR FORMING HELICAL GEARS

Filed Feb. 26, 1920     5 Sheets-Sheet 1

INVENTOR

Nis Leerberg
Green and McCallister
his atty's.

Patented Jan. 15, 1924.

1,480,910

UNITED STATES PATENT OFFICE.

NIS LEERBERG, OF EDGEWOOD, PENNSYLVANIA.

MACHINE FOR FORMING HELICAL GEARS.

Application filed February 26, 1920. Serial No. 361,591.

*To all whom it may concern:*

Be it known that I, NIS LEERBERG, a citizen of the United States, and a resident of Edgewood, in the county of Allegheny and State of Pennsylvania, have made a new and useful Improvement in Machines for Forming Helical Gears, of which the following is a specification.

My invention relates to helical or herringbone gears, especially those of large diameters, and consists in a machine for planing such gears.

Figure 1:
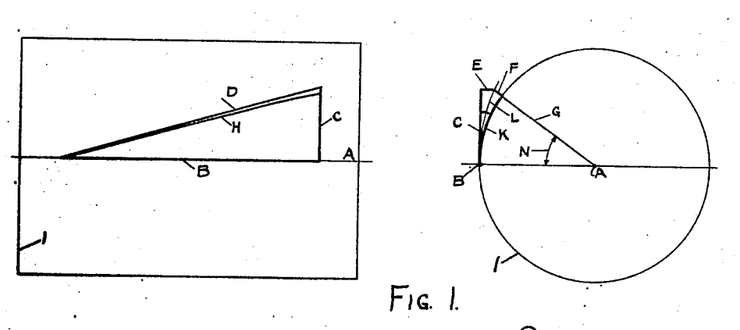
Fig. 1 is the diagram referred to above.

The nearest approach to my invention is disclosed in U. S. Patent 1,197,376 but the machine there described does not produce a gear tooth the elements of which are true helices. Two features in common with my method and the prior art as illustrated in the above mentioned patent are the stationary position of the gear blank during formation of the tooth and machining the latter by means of a planing tool. Under these conditions it is necessary for the cutting edge of the planing tool, in making each cut, to travel a helical path about the axis of the blank. Figure 1 is a diagram of this path and of the components which produce it.

With the base B, of a right triangle, parallel with the axis A of a cylinder 1 representing the blank to be cut, the triangle hypothenuse D wrapped about the cylinder becomes a helix H. The altitude C of the triangle then becomes arc K which determines the tooth advance. Base B determines the horizontal width of the cut. Base B and altitude C of the triangle are two components of a tool movement produced by my machine in carrying out my method. The velocities of the mechanisms producing these two components bear a constant ratio to each other; hence these mechanisms may be geared to each other by the usual spur gears.

To move the tool about the cylindrical surface instead of in a vertical plane, I provide third and fourth components E and F. Component E moves the tool in towards blank 1 until it meets a radius vector G which passes thru axis A and a point on the tooth element being cut. Component F moves the tool radially along G and towards axis A an amount necessary to bring the tool to the tooth element. The mechanisms producing components E and F do not have constant velocity ratios to each other or to the mechanisms producing components B and C and I obtain components E and F by means of cams which produce their respective tool movements with independently increasing velocities and I am thereby enabled to produce true helical movement of the tool.

If the planing tool was a mathematical point, the above components would be sufficient to secure an effective travel of same, but the tool cutting edge is on a substantial body and it is necessary to maintain clearance and rake angles between same and the blank. Consequently as the tool cutting edge travels along the helix, the tool must be tilted at a constantly increasing angle to its original position in order to maintain its original angularity with the radius vector G and thereby maintain the required angles between its surfaces and the adjacent surface of the blank. This element of tool control may be designated as a fifth, angular or rotary component, represented in Fig. 1 by the angle N between the initial and terminal positions of the radius vector G.

The main object of my invention is to provide a machine for planing effectively along a helix by providing the above components of a tool's travel.

Other objects of my invention are to provide feeding means for successive cuts of the planing tool and to adapt the machine to be adjusted simply and accurately to cut different pitches and angles of teeth on the same blank or on different sizes of blanks.

In adapting my machine to cut herringbone teeth, the cutting tool and its holding and moving mechanisms are duplicated but the accompanying drawings (except Fig. 3) show only one tool and its mechanism, i. e. substantially only half of my preferred whole construction. In these drawings.

Figure 2:
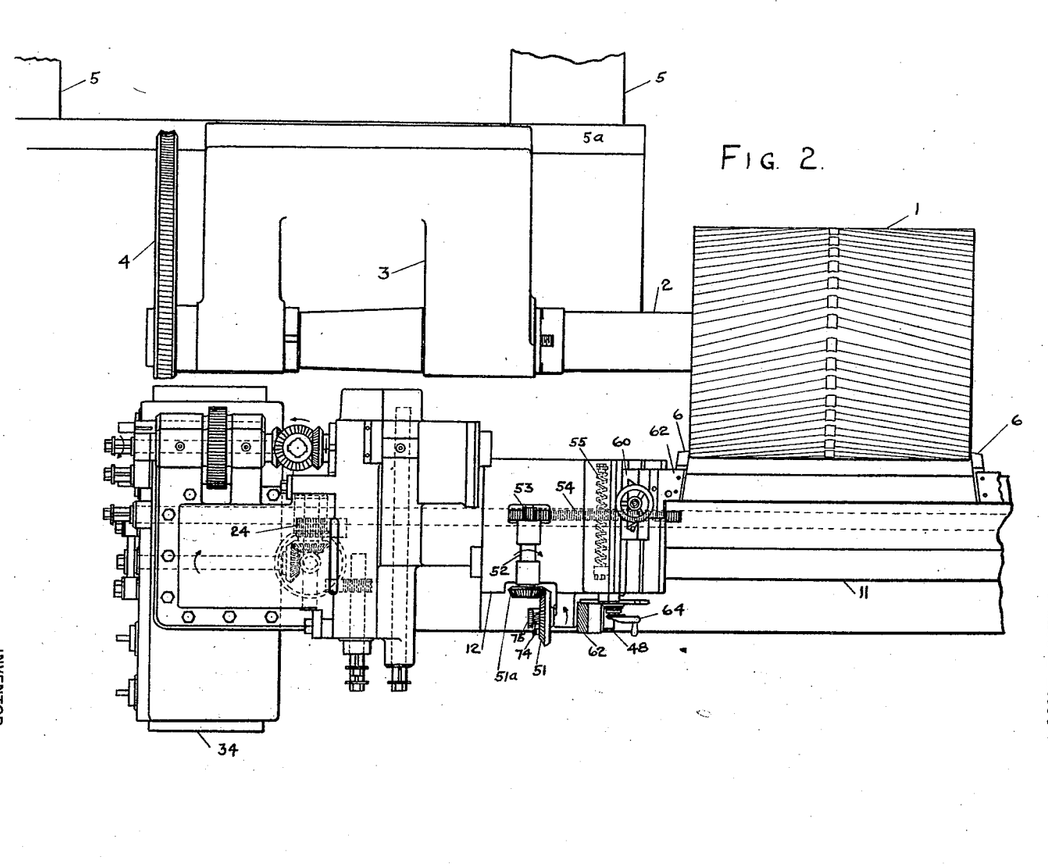
Fig. 2 is a plan of a part of the machine with a blank mounted thereon.
Figure 4:
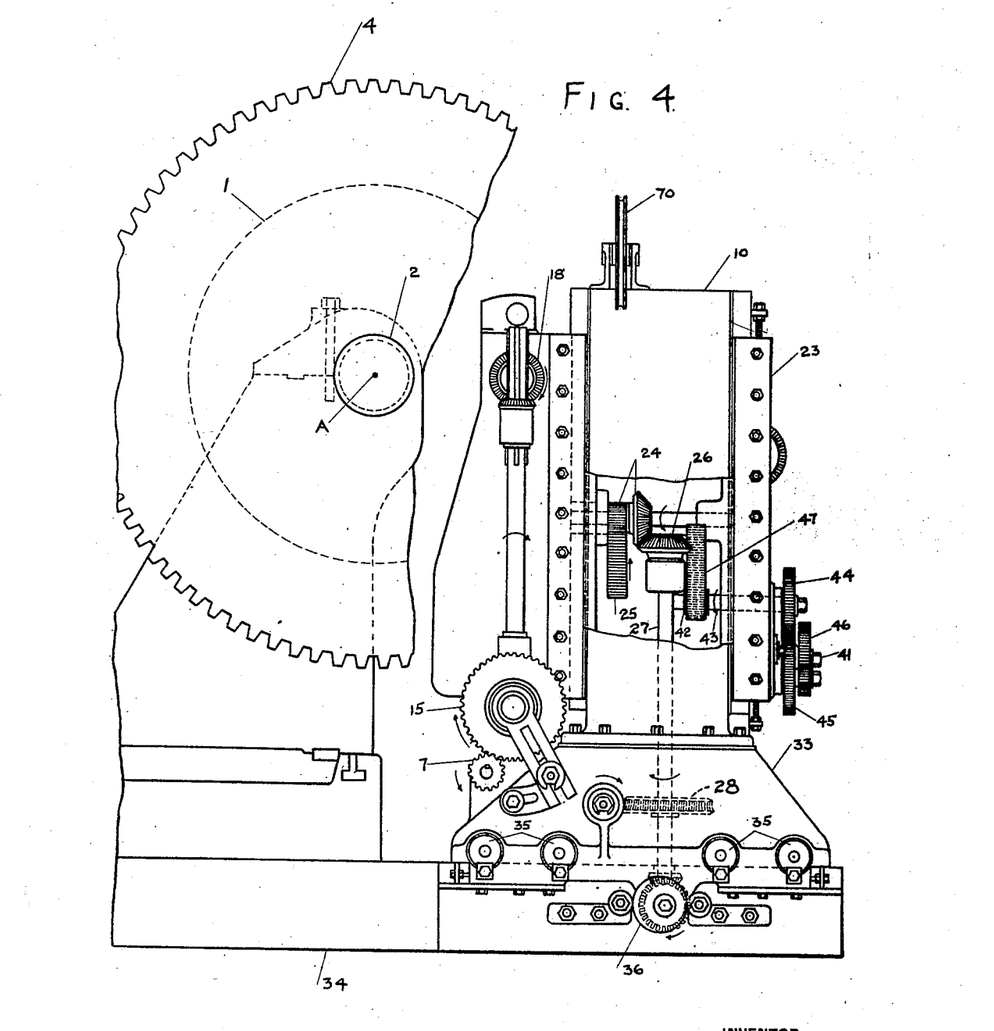
Fig. 4 is an end elevation, cut away in part to better illustrate hidden portions of the machine.

The blank 1 is fixedly mounted upon an arbor 2 (Fig. 2) which is journaled in a headstock 3 and equipped with any suitable indexing mechanism and locking means as indicated at 4. Headstock 3 is mounted on slides 5 and 5ᵃ for initial adjustment transversely of and parallel with the planing tool mechanism. The planing tool is indicated at 6. The operating parts of the planer are coordinated thru suitable gears and cams and the single power source is from a motor drive shaft which is provided with a relatively fixed pinion 7 (Fig. 4). The small arrows thruout the drawings indicate the direction of rotation or other movement of the various parts when a cut is being made on the work.

*Longitudinal component B.*—A wide U shaped member having a base 8 and uprights 8ᵃ (Fig. 3) is pivotally supported by pins 9 at its opposite ends on standards 10. Member 8 is provided with a longitudinal slide 11, parallel to the axis A of blank 1, and mounted on which are travelling carriages 12. Each carriage 12 is provided with rack 13 engaging a pinion 14, journaled in member 8, and by rotation of pinion 14 the carriage is moved along slide 11 to provide the longitudinal component B parallel with the blank's axis A. Pinion 14 is driven by motor pinion 7 thru gear 15, bevel gears 16, 17, differential gearing 18, bevel gears 19, worm 20 and worm wheel 21 fixedly mounted on the shaft which carries pinion 14.

*Vertical component C.*—Standards 10 are each mounted on a vertical slide 22 on a column 23 and upward movement of these standards on the columns provides the vertical component C of the tool's travel. This movement is secured by rotation of a pinion 24 (Figs. 4 and 3) jounaled in column 23 and which meshes with a rack 25 integral with standard 10. Pinion 24 is driven by a bevel gear 26 which meshes with a bevel gear portion of pinion 24. Gear 26 is integral with a shaft 27 which carries a fixedly mounted worm wheel 28 driven by worm 29 on shaft 30 which is connected by change gears 31 and 32 with gear 15 and driving pinion 7.

Figure 3:
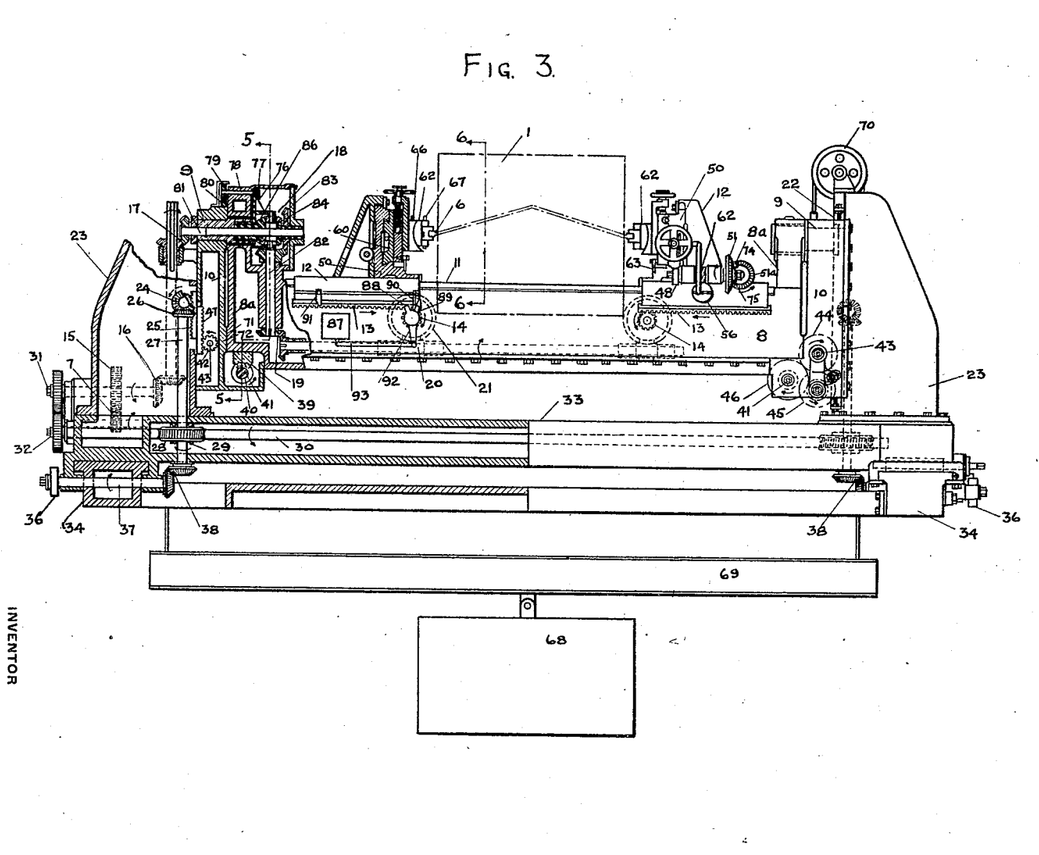
Fig. 3 is longitudinal vertical elevation and section showing the whole machine and including duplicate tool operating mechanisms.

*Transverse component E.*—The machine columns 23 are mounted on a rigid connecting base 33 which is slidingly supported on and guided by sole plates 34 (Figs. 3 and 4.) The friction between base 33 and sole plates 34 is relieved by use of rollers 35. Sliding movement of base 33 and columns 23 towards the blank provides the transverse component E of the helical travel of tool 6. This movement is secured by a cam 36 mounted on a shaft 37 journaled in column base 33 and driven by motor pinion 7 thru gears 15, 31, 32, shaft 30, worm 29, worm wheel 28, vertical shaft 27 and bevel gears 38.

The resultant of these three components, B, C and E, lies in the curved surface indicated by the arc L (Fig. 1) and is the path of travel of pin 9.

Figure 5:
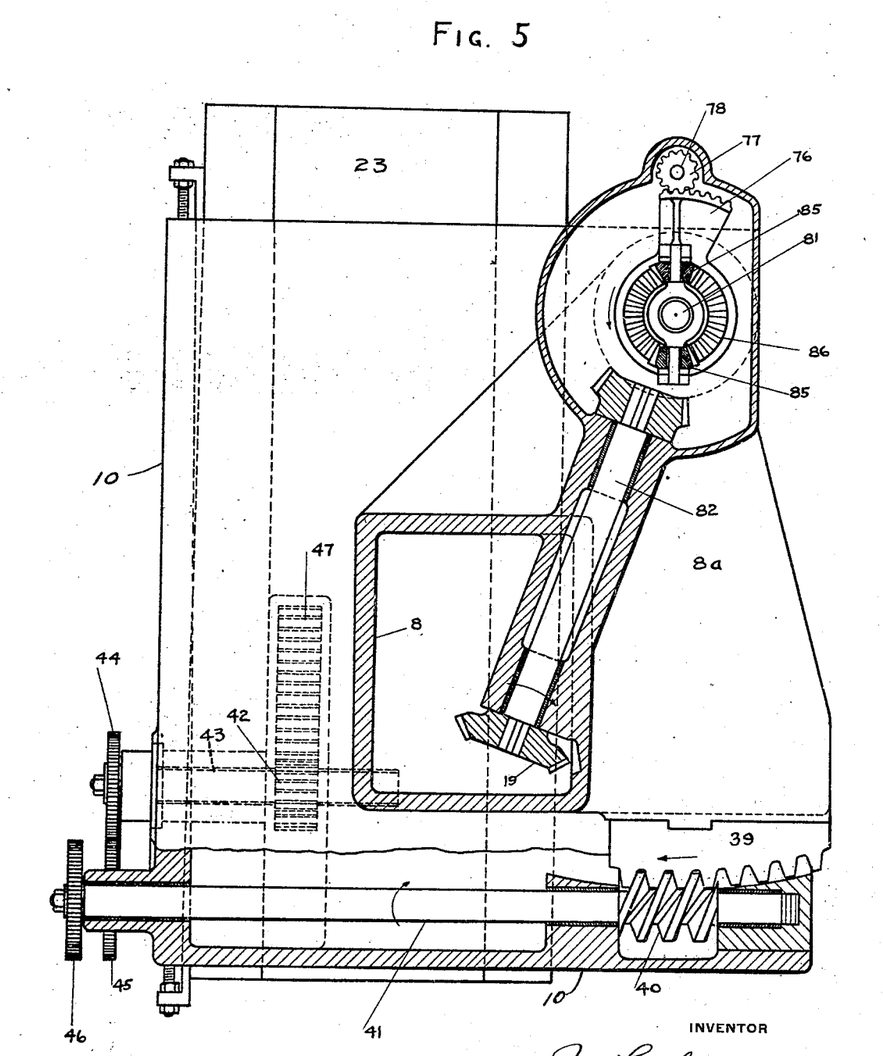
Fig. 5 is a vertical, transverse section on line 5—5 of Fig. 3.

*Angular component N.*—Member 8 is provided with an intergral, depending gear segment 39 (Figs. 5 and 3) which is driven by a worm 40 fixed on shaft 41 which is journaled in standard 10. Shaft 41 is driven by pinion 42 on shaft 43 thru change gears 44, 45 and 46. Pinion 42 meshes with a rack 47 on column 23. Hence vertical movement of member 8 and standard 10, as described previously, results in rotation of pinion 42, and worm 40 and in pivotal movement of member 8 and its carriage 12 about pin 9. This pivotal movement maintains the angle between the axis of tool 6 and the radius vector G from axis A of blank 1 thru the contacting point of the tool and thereby provides the angular or rotary component N.

Figure 6:
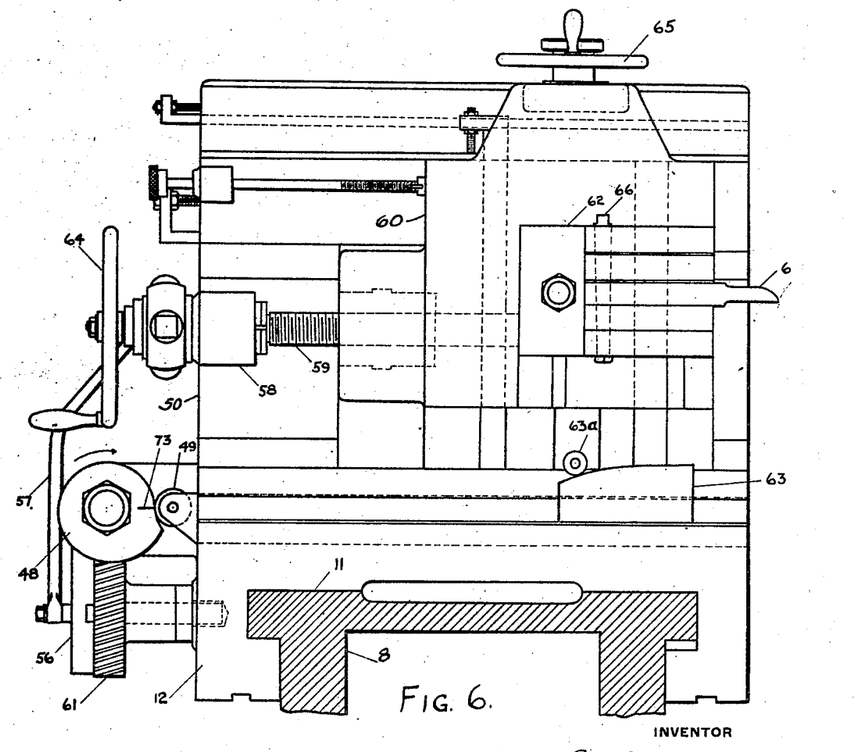
Fig. 6 is a vertical, transverse section on line 6—6 of Fig. 3.

*Radial component F.*—Tool movement towards the axis of the blank along radius vector G is provided by cam 48 (Figs. 6, 2 and 3) journaled on carriage 12 and which bears against roller 49 on slide 50 which moves transversely of the carriage. Cam 48 is rotated by bevel gears 51 and 51ᵃ, shaft 52 which carries a pinion 53 which meshes with a rack 54 on slide 11. It will be noted that tool 6 travels from initial to terminal positions upwards and towards the vertical plane of the blank's axis, hence there is no necessity for any reciprocal movement of slide 50 to and fro during a cutting stroke. This avoids any inaccuracies due to lost motion caused by reversing the direction of the slide movement. A compression spring 55 connects slide 50 and carriage 12 and maintains contact of roller 49 and cam 48.

The above described mechanisms produce all the components of the helical path shown in Fig. 1. The use of cams 36 and 48 provides means for varying the velocity of the respective mechanisms actuated by them. Changes in the diameter of the gear blank or changes in the lead of the tooth helix in the same diameter of blank will be accommodated by changing these cams for others. If mathematically helical teeth are not deemed necessary a limited number of cams may be utilized for all variations in the sizes of gears being cut; this series of cams and their use resembling the familiar series of Brown & Sharpe gear cutters used for all variations in the diameter of teeth cut by them.

The angular motion of member 8 is independent of the tooth pitch and the blank diameter and is varied, when necessary for different work by changing gears 31 and 32 to vary vertical travel of standards 10 and changing gears 44, 45 and 46 to vary pivotal movement of segment 39.

The feed of tool 6 for successive cuts is obtained thru disk 56 (Figs. 6, 2 and 3) and crank 57 which operates a ratchet index 58 on feed screw 59, feeding a tool slide 60 on slide 50. Disk 56 is rotated by helical gears 61 and 62, the latter being driven by gears 51, 51ª, pinion 53 and rack 54 to positively operate index 58 when carriage 12 returns to start a new cut. Tool 6 is clamped in a tool holder 62 vertically slidingly mounted on slide 60. The contour of the planed tooth is controlled by a former 63 of usual involute outline which supports holder 62 thru a roller 63ª thereby governing the vertical position of tool 6 as it is fed by screw 59 for successive cuts.

Hand wheels 64 and 65, quadrant screw 66 and clamping screw 67 are of the usual type for setting tool 6 initially and have no function at other times. The gravital pull on standards 10 and member 8 is counterbalanced by a counterweight 68 suspended with beam 69 on pulleys 70 or in other suitable manner.

Cam 48 should be adjustable about its shaft so that at the beginning of each cutting movement, the lowest point on the cam, indicated by mark 73, will contact with roller 49. This adjustment is obtained thru a worm 74 (Figs. 2 and 3) mounted on bevel gear 51 and engaging a worm wheel 75 fixed on the shaft which carries cam 48. This worm ordinarily locks gear 51 to the shaft but by rotating worm 74 manually, wheel 75, its shaft and cam 48 will be rotated to the desired point as gear 51 will be held by its engagement with gear 51ª.

To remove bending stress on pin 9 and to steady member 8 longitudinally, the lower portions of member 8 and standards 10 are provided with contacting bosses 71 and 72 respectively.

The function of differential 18 is to prevent the pivotal movement of member 8 producing any rotation of gears 19. By so doing, the movement of carriage 12 (component B) and the movement of slide 50 (component F) are controlled by driving-pinion 7 independently of any swinging movement of the carriage and tool slides. More specifically this function is provided by mounting the idler pinions of an ordinary differential on a spider which may rotate about drive shaft 81 to permit the idler pinions to roll on their gears. This idler pinion spider is shown at 76 (Figs. 5 and 3) and has an integral gear segment. A pinion 77 meshing therewith is fixed on a spindle 78 which is journaled in member 8ª and, at its opposite end, carries a pinion 79 meshing with a gear segment 80 fixedly mounted on standard 10 and corresponding with segment 76.

Suppose the driving shaft 81 and the driven shaft 82, thru member 8, be held against rotation, pivotal movement of members 8 and 8ª, carrying shaft 82, must rotate bevel gears 83 and 84 on shaft 81. If each differential idler pinion 85 rotates on its individual axis and both can revolve bodily with their axes about shaft 81, they can roll on bevel gear 84 and driving bevel gear 86 without affecting shafts 81 and 82. This bodily revolution of the pinions and their axes is insured by pinions 77 and 79 and segments 76 and 80 as differential pinions 85 are journaled on segment 76. The gear ratio between pinion 77 and segment 76 is half that between pinion 79 and segment 80 which gives segment 76 half the angular movement of spindle 78 about shaft 81 which is the same as that of member 8 and this provides the suitable rolling speed of idler pinions 85 so that when shaft 81 is rotating its movement results in proportional movement of shaft 82.

My machine is reversed by a master switch 87 which is shifted thru rod 93 by a lever 92. Lever 92 is pivoted between its ends and the end opposite rod 93 is formed with short arms 88 and 89. Fingers 90 and 91 are adjustably mounted on carriage 12 and at the end of alternate movements of the carriage they respectively engage arms 88 and 89 to operate lever 92 in opposite directions.

I am aware of the previous production of approximate helical teeth by planing around a cylindrical blank, but the departure from a true helix has been so large, when considered with respect to resulting uneven tooth pressures when the planed gear is in use, that the advantages of removing this error are apparent. By my method and machine, hand scraping, grinding, or other reduction of the errors for the planed teeth is eliminated and a more nearly perfect tooth produced.

I claim:

1. In a gear cutting machine, means for holding a blank stationary during the tooth cutting operation, a cutting tool, a plurality of associated elements for supporting and impelling said tool in a helical path having an axis coincident with the axis of the blank, said elements including a pivoted tool support, trunnions on which said support is pivotally mounted, simultaneously acting means for moving said trunnions vertically with relation to a horizontal plane passing through the axis of the blank and the helix to be generated on the blank, and for moving the trunnions transversely toward the axis of the blank so that the pivotal axis of the support always falls within the radius vector of the helix, and for swinging the support about said trunnions.

2. In a gear cutting machine, means for holding a blank to be cut stationary during the tooth cutting operation, a cutting tool, a plurality of simultaneously acting elements for supporting and impelling said tool along a helical path having an axis coincident with the axis of the blank, said elements including a pivotally mounted tool support, trunnions on which said support is pivotally mounted, means for moving said trunnions in a direction normal to a plane passing through the blank, means for moving said trunnions transversely to said normal direction and toward the axis of the blank so that the pivotal axis of the support always falls within a radius vector from the axis of the blank to the helix to be generated on the blank, and means for tilting said support about said trunnions so that the axis of the tool is always coincident with said radius vector of the helix from the axis of the blank and means for moving said tool longitudinally of the axis of the blank and inwardly toward the axis of the blank.

3. In a gear cutting machine, means for holding a blank stationary during the tooth cutting operation, a cutting tool, a plurality of simultaneously acting associated elements for supporting and impelling said tool in a helical path having an axis coincident with the axis of the blank, said elements including a pivotal tool support, trunnions on which said support is pivotally mounted, means for moving said trunnions vertically with relation to a plane passing through the axis of the helix to be generated on the blank, means for moving said trunnions transversely with relation to said vertical motion and toward the axis of the blank, so that the pivot points of the support will always fall within a radius vector from the axis of the blank to the helix to be cut on the blank, means for tilting the tool support about said trunnions so that the axis of the tool passing through the cutting point thereof, always coincides with said radius vector of the helix to be cut, and means for moving the tool longitudinally of the axis of the blank, said movements of said elements being so co-related and limited that the vertical movement of the trunnions is limited and defined by a development in a vertical plane of the helix to be cut.

4. In a gear cutting machine, means for holding a blank stationary during the tooth cutting operation, a cutting tool, a plurality of simultaneously acting elements for supporting and impelling said tool along a helical path having an axis coincident with the axis of the blank, said elements including a pivotally mounted tool support, trunnions on which said support is pivotally mounted, means for moving said trunnions in a direction normal to a plane passing through the axis of the blank, so that the displacement of the pivotal points of the support normal to the plane passing through the axis of the blank is at each instance equal to the circumferential advance of the helix angle, and means for moving said trunnions transversely with relation to the last mentioned direction of motion and toward the axis of the blank so that the pivotal axis of the support always falls within the radius vector of the helix to be generated on the blank.

5. In a gear cutting machine, means for holding a blank to be cut stationary during the tooth cutting operation, a cutting tool, a plurality of simultaneously acting elements for supporting and impelling said tool along a helical path having an axis coincident with the axis of the blank, said elements including a pivotally mounted tool support, trunnions on which said support is pivotally mounted, means for displacing the trunnions vertically with relation to a plane passing through the axis of the blank, a cam for moving said trunnions transversely and toward the axis of the blank with relation to the direction of vertical displacement, means for tilting the tool support to maintain a constant angular relation between the axis of the tool and the radius vector from the axis of the blank to the generated point of the helix, a cam for moving the tool inwardly along a radius vector of the helix and means for moving the tool longitudinally of the axis of the blank.

6. In a gear planing machine, a cutting tool and a plurality of mechanisms adapted respectively to produce component movements of said tool parallel to the axis of a cylindrical blank, vertical to the horizontal plane of said axis, transverse to the vertical plane of said axis and towards said axis, the resultant of said movements being a helix about said axis.

7. In a gear-cutting machine, means for holding the blank to be cut stationary during the tooth-cutting operation, a cutting tool impelled by a plurality of associated elements, a plurality of associated elements for supporting and impelling said tool, said elements including a pivoted tool supporting member, the pivot points of which move so that they always fall in a radius vector from the axis of the blank to the helix to be generated on the blank, means for swinging said supporting member about its pivotal points so that the axis of the tool is always coincident with a radius vector through the axis of the blank, and means for moving the tool radially toward the axis of the blank so that a point in the cutting edge thereof falls within the helix to be generated on the blank.

8. In a gear planing machine, a cutting tool and simultaneously operating means for producing component movements of said tool parallel to the axis of a cylindrical blank, vertical to the horizontal plane of said axis, transverse to the vertical plane of said axis, towards said axis and angularly about said axis, the resultant of said movements producing a helical movement of the cutting edge of said tool and maintaining constant angular relation between the axis of said tool and a radius vector extending from the blank axis to the cutting edge of said tool.

9. In a gear planing machine, a cutting tool and a plurality of mechanisms adapted respectively to produce movements of said tool parallel to the axis of a cylindrical blank, vertical to the horizontal plane of said axis, transverse to the vertical plane of said axis, towards said axis and angularly about said axis.

10. In a gear planing machine, a cutting tool and a plurality of mechanisms adapted respectively to produce component movements of said tool parallel to the axis of a cylindrical blank, vertical to the horizontal plane of said axis, transverse to the vertical plane of said axis, towards said axis and angularly about said axis, the resultant of said movements being a helical movement of the cutting edge of said tool and a rotary movement of the body of said tool which maintains a constant angular relation between the axis of said tool and a radius vector extending from the blank axis to the cutting edge of said tool.

11. In a gear planing machine, a cutting tool, means for producing movements of said tool parallel to the axis of a cylindrical blank, vertical to the horizontal plane of said axis, transverse to the vertical plane of said axis and towards said axis, means for providing a constant ratio between said first two mentioned movements and means for providing a varying ratio between each of said last two mentioned movements and said first two mentioned movements.

12. In a gear planing machine, a cutting tool, a first mechanism adapted to produce a movement of said tool parallel to the axis of the gear being planed, a mechanism geared to said first mechanism and adapted to produce a movement of said tool vertical to the horizontal plane of said axis, a cam driven mechanism adapted to produce a movement of said tool transverse to the vertical plane of said axis and a cam driven mechanism adapted to produce a movement of said tool towards said axis.

13. The combination of the subject matter of claim 12 with means for coordinating said mechanisms so as to produce a resultant helical movement of said tool.

14. In a gear planing machine, a cutting tool, a first mechanism adapted to produce a movement of said tool parallel to the axis of the gear being planed, a second mechanism geared to said first mechanism and adapted to produce a movement of said tool vertical to the horizontal plane of said axis, a third mechanism geared to said first and second mechanisms and adapted to produce an angular movement of said tool in a plane transverse to said axis, a cam driven mechanism adapted to produce a movement of said tool transverse to the vertical plane of said axis and a cam driven mechanism adapted to produce a movement of said tool towards said axis.

15. The combination with the subject matter of claim 14 with means for coordinating said mechanisms so as to produce a resultant helical movement of said tool and to maintain constant angles between the surfaces forming the cutting edge of said tool and the adjacent surface of the gear tooth being planed.

16. In a gear planing machine, horizontally slidable columns, standards vertically slidable upon said columns, a member pivotally mounted on said standards, a carriage horizontally slidable on said member, a tool holder transversely slidable on said carriage and coordinated mechanisms adapted to produce predetermined movement of each of the elements mentioned.

17. In a gear planing machine, means for holding a blank stationary, means for indexing said blank about its axis, columns moving towards said blank, upwardly movable standards mounted on said columns, a member so mounted on said standards as to pivot thereon to maintain a constant angular relation between said member and the radius vector from said axis to the point of contact of the tool with said blank, a carriage so mounted on said member as to move parallel to said axis, a tool holder so mounted on said carriage as to move transversely of said carriage, and driving mechanism for said tool holder.

18. The combination of the subject matter of claim 17 with means for changing the ratio between the extents of any two of the movements indicated.

19. In a gear planing machine, a drive shaft, a member having pivotal movement about said shaft, tool moving elements slidingly mounted on said member, gearing driven from said shaft and adapted to move said elements, and a differential mechanism between said shaft and said gearing whereby pivotal movement of said member about said shaft is prevented from producing sliding movement of said elements.

20. In a gear planing machine, a standard, a drive shaft journaled therein, a tool carrying member having pivotal movement about said shaft, tool moving elements slidingly mounted on said member, a bevel gear rotatably mounted on said shaft, rotatable driving means for said elements geared to said bevel gear, a bevel gear fixedly mounted on said shaft, bevel idler pinions meshing with said bevel gears and mounted on a spider rotatable about said shaft, a gear segment integral with said spider, a gear segment integral with said standard, and a spindle journaled in said member and provided with integral pinions meshing respectively with said gear segments, said gears, pinions and gear segments comprising a differential mechanism whereby rotation of said shaft produces proportional rotation of said means independently of the pivotal movement of said member.

21. In a gear cutting machine, means for holding a blank to be cut stationary during the gear cutting operation, a cutting tool, a plurality of simultaneously acting elements for supporting and impelling said tool along a helical path having an axis coincident with the axis of a blank, said elements including a pivotally mounted tool support, trunnions on which said support is pivotally mounted, means for moving said trunnions in a direction normal to a plane passing through the axis of the blank, a cam for moving said trunnions transversely with relation to said last mentioned direction of motion and toward the axis of the blank so that the pivotal axis of the support always falls within a radius vector from the axis of the blank to the helix to be generated on the blank, means for tilting said support about said trunnions so as to maintain a constant angular relation between the axis of the tool and the radius vector of the helix to be generated passing through the axis of the blank and the cutting point of the tool, means for moving said tool radially with relation to the blank, means for moving said tool longitudinally of the axis of the blank and means for co-relating the before mentioned normal movement of said trunnions and the longitudinal movement of said tool so as to maintain a constant relation between said normal and longitudinal displacement of the tool.

22. In a gear cutting machine, means for holding a blank to be cut, a cutting tool, a plurality of simultaneously acting associated elements for supporting and impelling said tool along a helical path with relation to the blank, said elements including a pivoted tool support, simultaneously acting means for moving said support so as to maintain the pivot point thereof in a radius vector passing through the axis of the blank and the point of generation of the helix on the blank and means for swinging the support about the pivot point so as to maintain a constant angular relation between the axis of the tool and the radius vector of the helix passing through the point of generation.

23. A machine for cutting helical gears, comprising a tool, means for moving the tool along the helical tooth to be cut, and means for turning the tool by an amount proportional to the movement of the cutting point of the tool about the axis of the gear blank, substantially as described.

24. A machine for cutting helical gears, comprising a tool, means for moving the tool in a helical path along the periphery of the gear blank to cut a helical tooth, and means for turning the tool as it moves along the gear blank by an amount equal to the angle about the axis of the gear blank subtended by the movement of the cutting point of the tool about the periphery of the gear, substantially as described.

In testimony whereof, I have hereunto subscribed my name this 6th day of February, 1920.

NIS LEERBERG.